Figure 1:
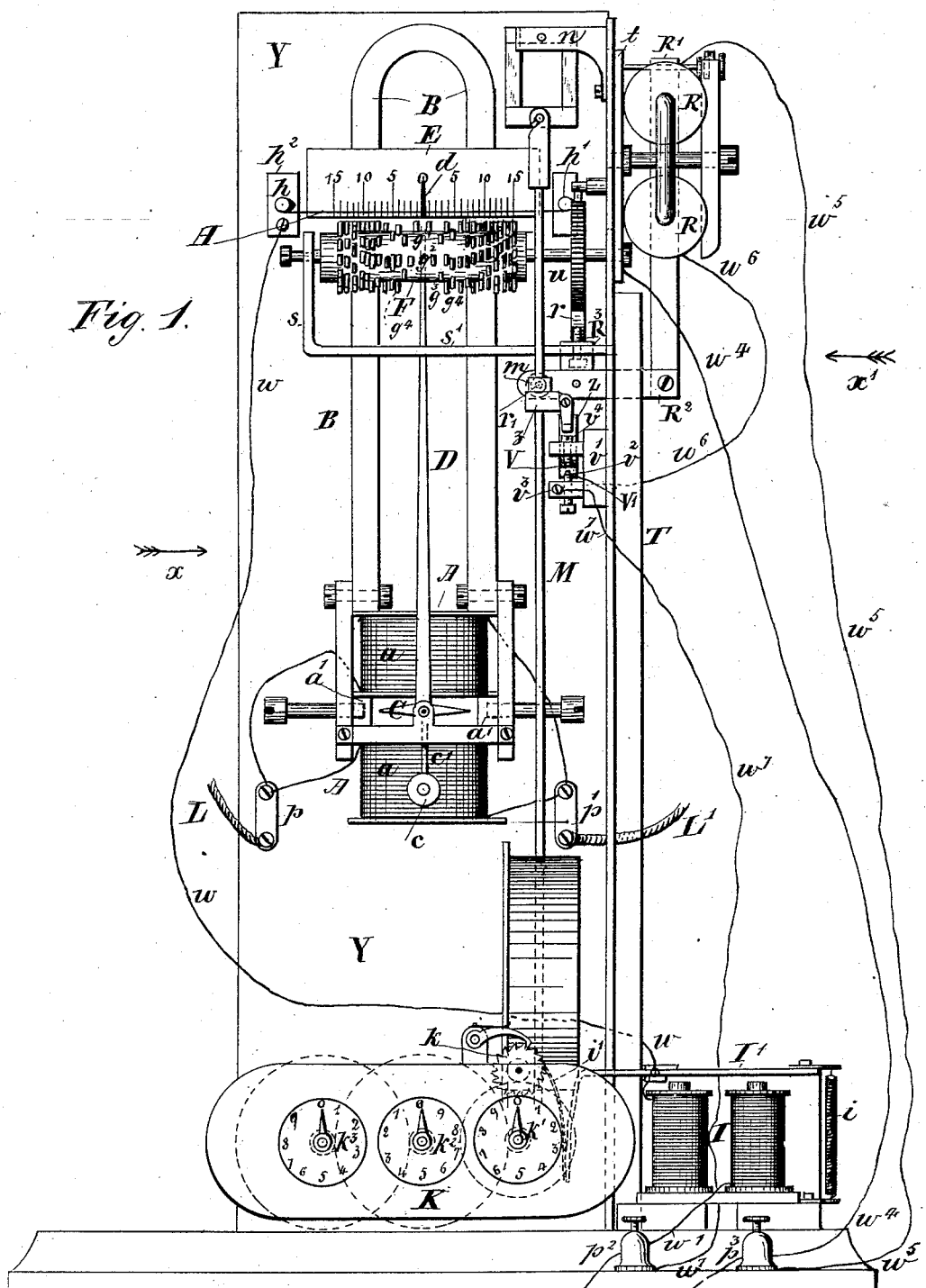

(No Model.)　　　　　　　　　　　　　　　　　　6 Sheets—Sheet 1.
J. CAUDERAY.
APPARATUS FOR MEASURING ELECTRICITY.
No. 310,252.　　　　　　　　　Patented Jan. 6, 1885.

Witnesses  
Samuel Owen Edmonds  
W. E. Boulter

Inventor  
Jules Cauderay  
Henry Orth  
his atty.

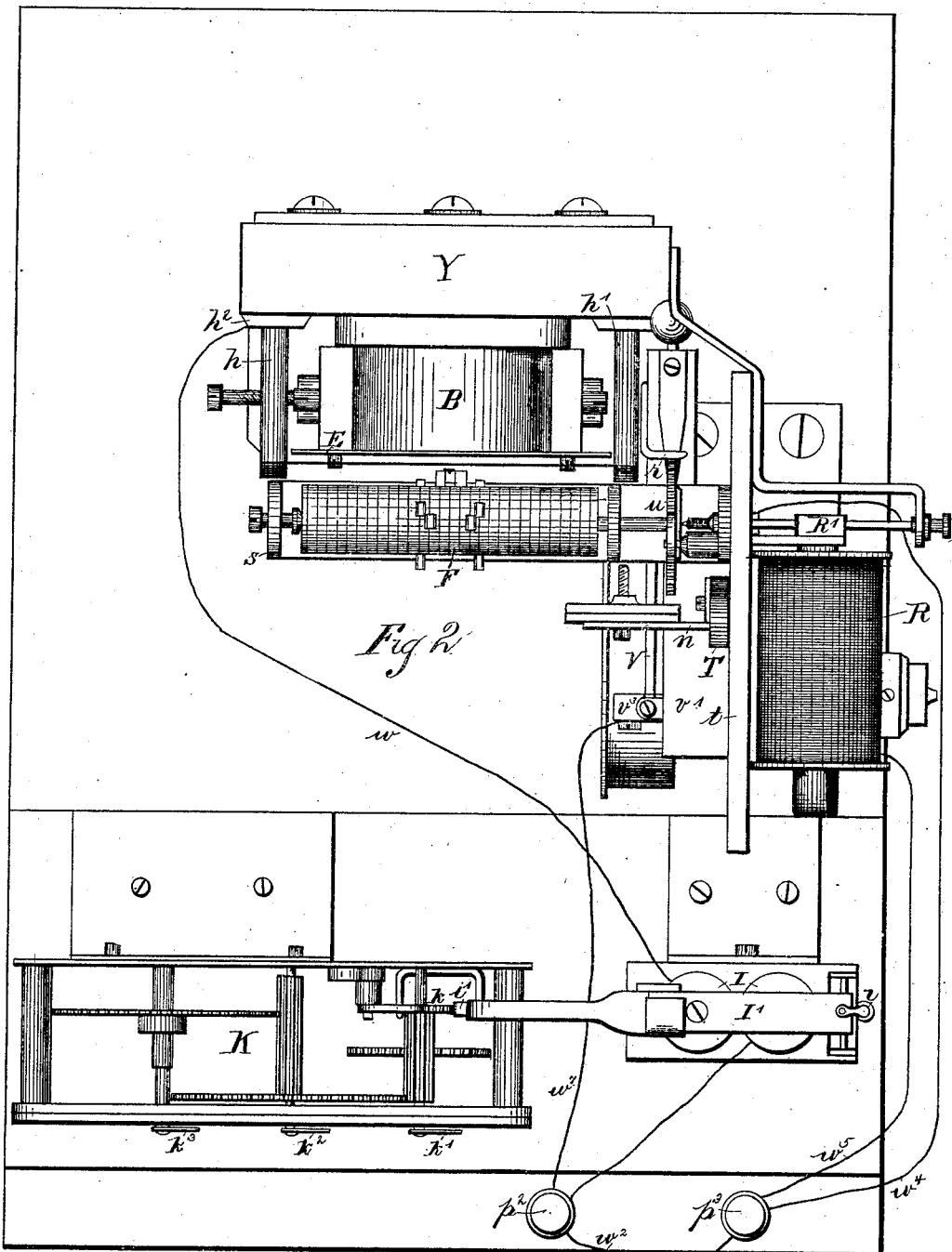

(No Model.)
J. CAUDERAY.
APPARATUS FOR MEASURING ELECTRICITY.
No. 310,252. Patented Jan. 6, 1885.
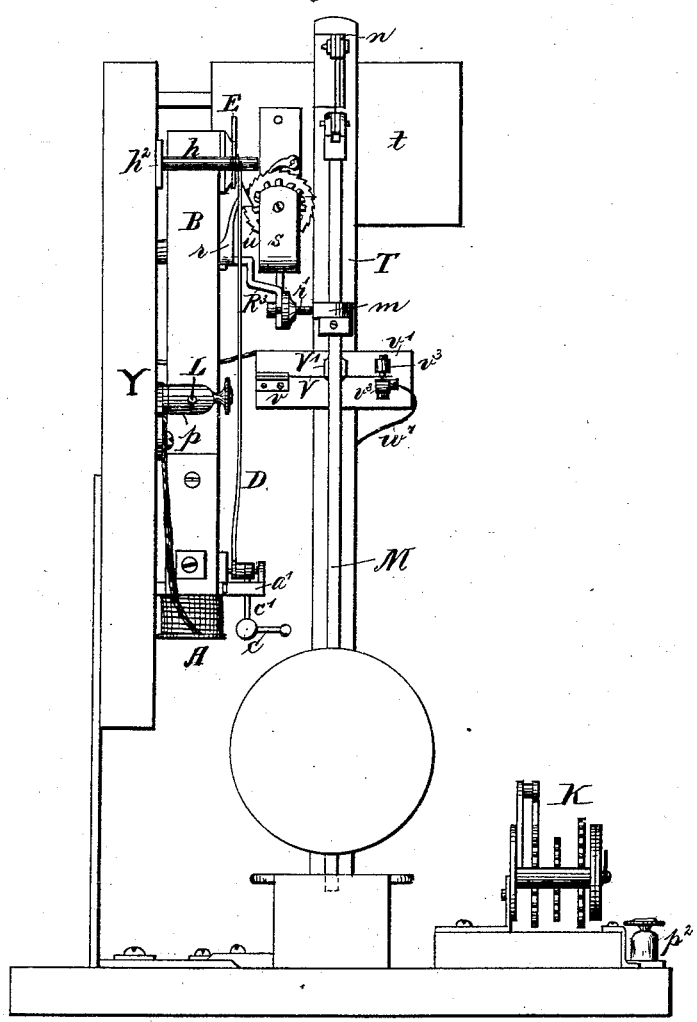

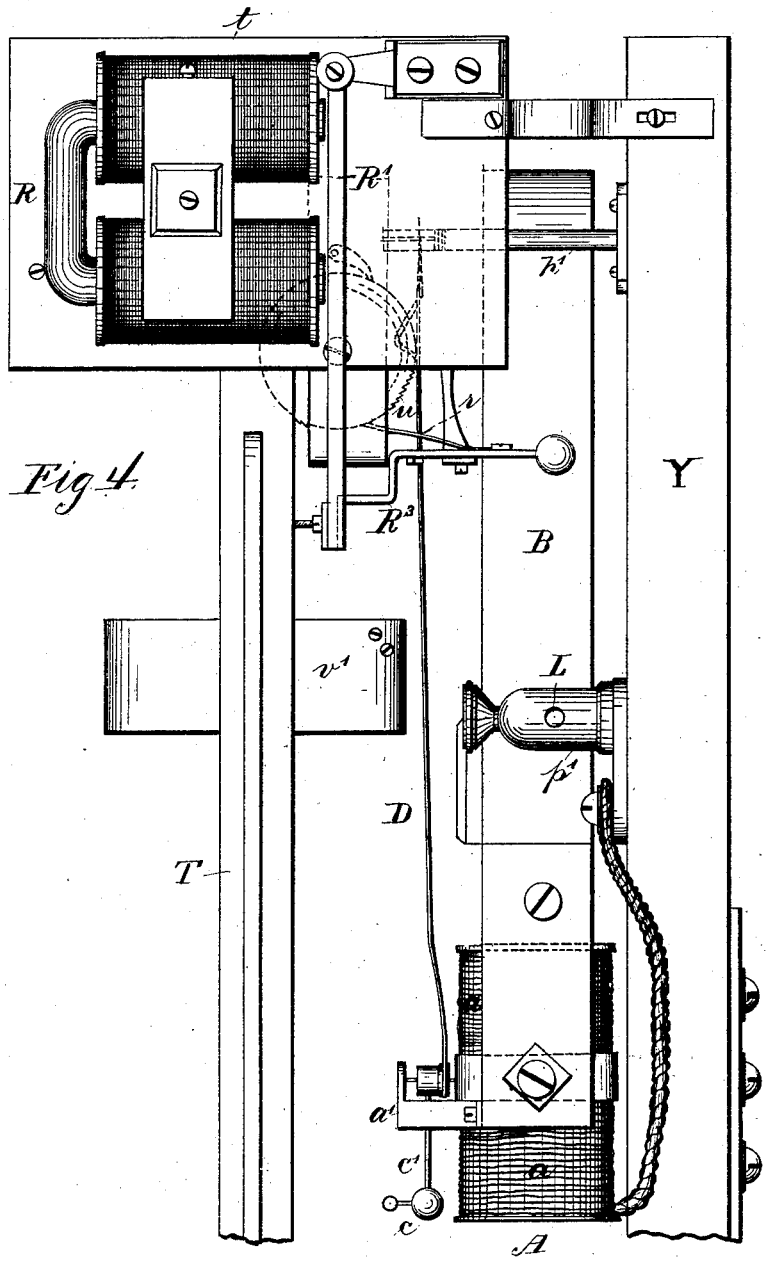

(No Model.)  
J. CAUDERAY.  
APPARATUS FOR MEASURING ELECTRICITY.
No. 310,252. Patented Jan. 6, 1885.
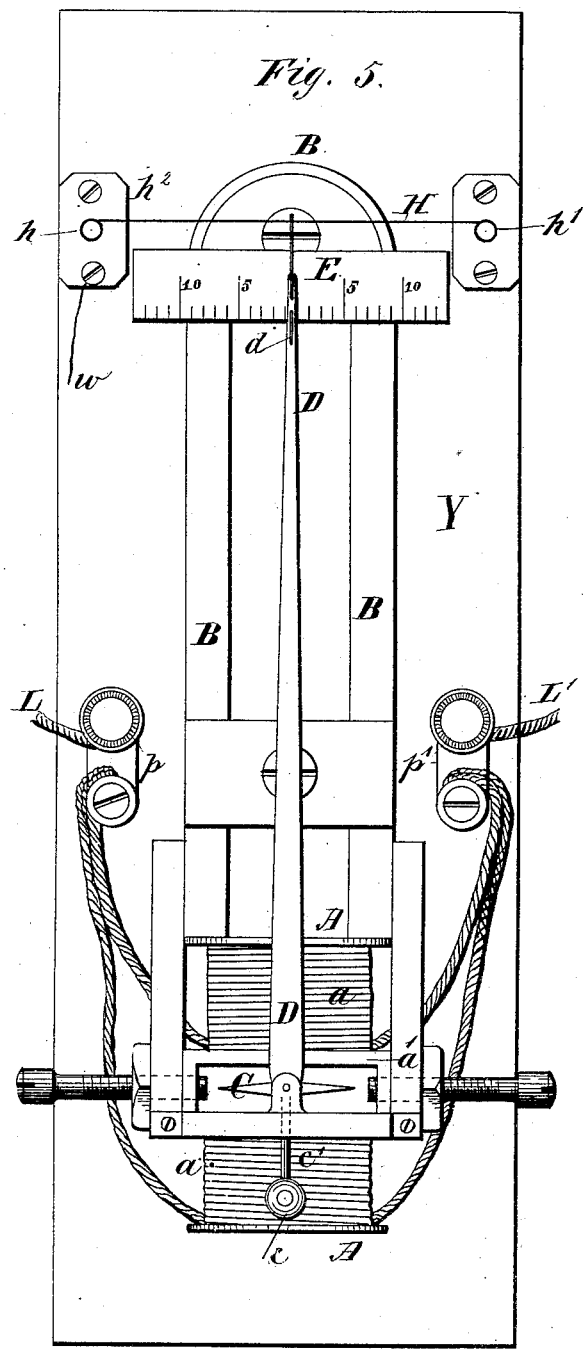
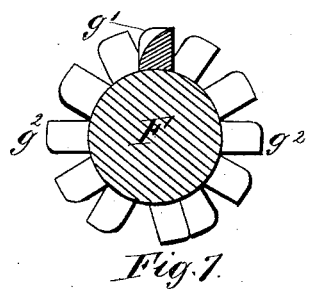
Fig. 7.
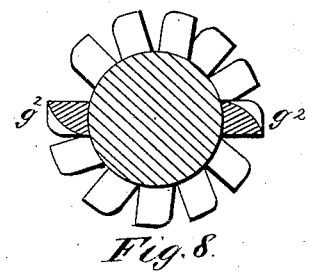
Fig. 8.
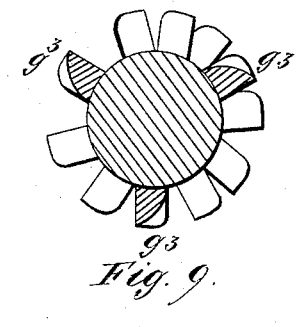
Fig. 9.
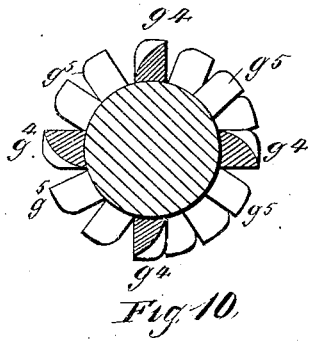
Fig. 10.

(No Model.)   J. CAUDERAY.   6 Sheets—Sheet 6.
APPARATUS FOR MEASURING ELECTRICITY.
No. 310,252.   Patented Jan. 6, 1885.
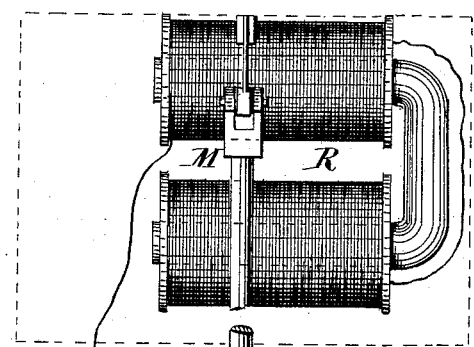
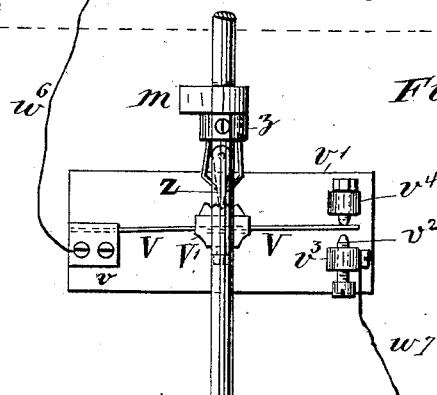
Fig 6.

UNITED STATES PATENT OFFICE.

JULES CAUDERAY, OF LAUSANNE, SWITZERLAND.

APPARATUS FOR MEASURING ELECTRICITY.

SPECIFICATION forming part of Letters Patent No. 310,252, dated January 6, 1885.

Application filed May 1, 1883. (No model.) Patented in France March 17, 1883, No. 154,362; in Belgium April 2, 1883, No. 60,946; in Germany April 5, 1883, No. 25,542; in England April 7, 1883, No. 1,756; in Italy August 2, 1883, No. 15,793; in Spain November 16, 1883, No. 4,791, and in Austria-Hungary August 23, 1884, No. 13,180 and No. 38,179.

*To all whom it may concern:*

Be it known that I, JULES CAUDERAY, a citizen of the Swiss Republic, residing at Lausanne, in Switzerland, have invented certain new and useful Improvements in Apparatus for Measuring Electricity, Applicable for other Purposes, (for which I have obtained Letters Patent in France, No. 154,362, dated March 17, 1883; in Belgium, No. 60,946, dated April 2, 1883; in Germany, No. 25,542, dated April 5, 1883; in Great Britain, No. 1,756, dated April 7, 1883; in Italy, No. 15,793, dated August 2, 1883; in Spain, No. 4,791, dated November 16, 1883, and in Austria-Hungary, No. 13,180 and No. 38,179, dated August 23, 1884,) of which the following is a specification.

This invention relates to an instrument for measuring and registering the quantity of electric current passing on a conductor in a given time, its object being to translate the units of strength or ampères of current, as indicated by a galvanometer, into units of quantity or coulombs. When a current having a strength of one ampère flows upon a conductor, each second of time that it continues is equivalent to one coulomb of quantity, a current of two ampères gives two coulombs per second, and so on. It is obvious, then, that an instrument which will multiply the number of ampères indicating the strength of a current by the number of the seconds during which such current continues will give the quantity or number of coulombs of current flowing. I have therefore combined with a galvanometer, or instrument for measuring the strength of current, a time mechanism, which will register the number of ampères indicated by the galvanometer in a given number of minutes. By multiplying the number of ampères registered by 60 the quantity or number of coulombs of current is obtained.

My invention will be readily understood from the following particular description, in connection with the accompanying drawings, in which—

Figure 1 is a front elevation, Fig. 2 a top plan view, and Fig. 3 a side elevation in the direction of the arrow $x$ in Fig. 1. Fig. 4 is a partial side elevation in the direction of the arrow $x'$, Fig. 1. Fig. 5 is an enlarged front view of the galvanometer and magnet. Fig. 6 is an enlarged view of the pendulum, its magnet, and circuit-closer. Fig. 7 is a cross-section of the toothed circuit-closing cylinder in a plane corresponding with the graduation of the galvanometer-needle indicating one ampère. Fig. 8 is a similar cross-section in the plane of graduation for two ampères; Fig. 9, the same in the plane of graduation for three ampères, and Fig. 10 in the plane of the four-ampère graduation.

The letter A, Figs. 1 and 3, indicates a vertical galvanometer arranged between the dependent legs of a permanent horseshoe-magnet, B, which is secured to a vertical back board, Y. The two divisions $a\ a$ of the galvanometer-coil are respectively above and below a brass or other preferably non-magnet frame, $a'$, transversely in which is pivoted a shaft or arbor upon which is fixed the galvanometer-needle C. To this shaft of the galvanometer-needle is fixed an upwardly-extending pointer, D, which is held normally in a true vertical position by an adjustable counter-weight, $c$, upon an arm, $c'$, projecting downwardly from the shaft.

The terminals of the galvanometer-coils are connected with the binding-posts $p\ p'$ in the usual manner, and to these posts are to be connected the line-wires, as at L L', of the circuit the current on which is to be measured.

Behind the upper end of the pointer D is arranged a horizontal scale, E, graduated to the right and left from a central zero-point. The graduations of the scale correspond to the deflections of the pointer, resulting from movements of the galvanometer-needle under the influence of electric currents. On each side of the zero-point the graduation indicates the position of the pointer when a current of one ampère traverses the coils, the direction of the deflection of the pointer being in accordance with the direction of the current. The higher graduation indicates greater strength of current, as two, three, four, or more ampères.

In front of the plane in which the pointer D vibrates is a horizontal metallic cylinder, F, pivoted between standards $s\ s$ on arm $s'$, projecting from a cross-piece, $t$, carried by a post, T. On opposite sides of a central vacant space the cylinder F is provided with metallic teeth $g'$ $g^2$ $g^3$, &c., which are arranged to strike the pointer, or a projection, $d$, thereof, in its various positions. The arrangement of the teeth in separate peripheral series on the cylinder is such that at each complete revolution of the cylinder the pointer will be struck by a number of teeth corresponding to the graduation of the scale E, opposite which the said pointer stands. For instance, on a peripheral line opposite the graduation 1 of the scale the cylinder has one tooth, $g'$, and if the pointer stands at the graduation 1 while the cylinder makes a revolution, it will be struck once; if at the graduation 2, it will be struck twice—that is, by the two teeth $g^2$ $g^2$—and so on.

Immediately behind the pointer D, which is of metal, a fine platinum wire, H, is stretched between two metallic arms, $h$ $h'$, the former of which projects from a metal plate, $h^2$, which is connected by wire $w$ with one terminal of the coils of an electro-magnet, I, the other terminal of which is connected by a wire, $w'$, to a binding-post, $p^2$, from which a wire, $w^2$, leads to one pole of a battery, X, the other pole of which is, by a wire, $w^3$, connected to a binding-post, $p^3$, from which a wire, $w^4$, leads to the metallic bearings of one of the journals of cylinder F. The electro-magnet I has its armature-lever I' connected at one end to a spring, $i$, which normally retracts it, and it is at its other end prolonged and bent downward to carry a spring-pawl, $i'$, which engages with the teeth of a ratchet-wheel, $k$, on the driving-shaft of a registering mechanism, K. This registering mechanism is similar to those used in gas-meters and similar apparatus, and need not be further described than to say that units are counted by the index $k'$, tens by index $k^2$, and hundreds by index $k^3$, the multiplying gearing being well known. Each upward movement of the armature-lever and spring-pawl moves the ratchet-wheel one tooth and causes one unit to be registered by the index $k'$.

The pointer D will be pressed against the wire H for an instant each time it is struck by one of the teeth of cylinder F, and it will now be seen that each time the said pointer is pressed into contact with the wire H the circuit of the battery X will be closed through the electro-magnet I, which will operate its armature-lever to cause the spring-pawl $i'$ to engage a fresh tooth of ratchet-wheel $k$ and move it one tooth forward when the lever is retracted, thus causing one unit to be registered by the registering mechanism. The circuit as closed by the pointer leads from one pole of battery X over wire $w^2$, post $p^2$, wire $w'$, coils of magnet I, wire $w$, plate $h^2$, arm $h$, wire H, pointer D, the cylinder and its tooth in contact with the pointer, the journal of the cylinder and its bearing, wire $w^4$, post $p^3$, and wire $w^3$, to the other pole of the battery.

The cylinder F is caused to make one complete revolution in each minute of time while the meter is in operation. It is immaterial what time mechanism is employed to give the cylinder this regular rotation; but I have in practice found efficient, and have shown in my drawings, mechanism similar to the motive devices of an electric clock.

The letter M designates a pendulum suspended in a well-known manner from an arm, $n$, projecting from the post T, and having a proper length to make a complete vibration in one second.

Upon the cross-arm of the post T is secured an electro-magnet, R, in front of the pole of which is an armature, R', pivoted at its upper end, and carrying at its lower end a laterally-projecting arm, R², from which projects rearwardly another arm, R³, carrying a spring-pawl, $r$, arranged to engage with the teeth of a ratchet-wheel, $u$, which is fixed upon the projecting end of the shaft of the cylinder F. This ratchet-wheel has sixty teeth, and through the arm R² of the armature R is arranged a screw, $r'$, the tip of which stands in the path of a tappet, $m$, on the pendulum. This screw is so adjusted that when the armature hangs free and the tappet $m$ strikes the tip of the screw, on the swinging of the pendulum in that direction the armature R and arms R² R³ will be driven rearwardly a proper distance for the spring-pawl $r$ to engage a fresh tooth of the ratchet-wheel $u$. At this moment it is necessary that the pendulum shall receive a return-impulse, and also that the spring-pawl be drawn forward to give the ratchet-wheel and cylinder F a partial rotation equal to the space of one tooth of the wheel. These purposes are accomplished by the action of the electro-magnet R, through the coils of which at the proper instant a battery-circuit is completed by the action of an automatic circuit-closer operated by the pendulum.

It will be observed that from the binding-post $p^3$ a wire, $w^5$, leads to one terminal of the coils of electro-magnet R, and from the other terminal of said coils a wire, $w^6$, leads to a metallic bracket, $v$, secured to a non-conducting cross-piece, $v'$, on post T. To this metallic bracket $v$ is secured one end of a light metallic strip-spring, V, lying horizontally, and having its free tip directly over an adjustable metallic contact-point, $v^2$, from the metallic support $v^3$ of which a wire, $w^7$, leads to the binding-post $p^2$. The strip-spring V has a normal upward deflection which is limited by an adjustable stop, $v^4$, and upon said spring is mounted a longitudinally-adjustable tappet, V', having a curved upper edge, to receive the strokes of a finger, Z, depending from an adjustable lug, $z$, on the pendulum.

It will be understood that the tip of spring V is normally out of contact with the contact-point $v^2$; but when the finger Z strikes the tappet V' said spring will be forced downward sufficiently to cause its tip to make a good electrical contact with said point, and thus the circuit of battery X will be closed through the coils of electro-magnet R, for it will be seen that a branch circuit of said battery is formed by the wire $w^5$, coils of magnet R, wire $w^6$, bracket $v$, spring V, contact-point $v^2$, and wire $w^7$. The tappet V' is so adjusted that it will be struck by the finger Z to force down the spring V just as the spring-pawl $r$ engages a fresh tooth of ratchet-wheel $u$, and thus at the proper time the magnet R is energized and attracts its armature, causing the spring-pawl to impel the ratchet-wheel $u$ the space of one tooth and the screw $r'$ to react upon the tappet $m$ to give a return-impulse to the pendulum, whereby its vibratory motion may be kept up. As the complete vibrations of the pendulum are each made in one second, and each results in the partial rotation of the ratchet-wheel through a space equal to one of its sixty teeth, it is obvious that a complete rotation of the said wheel and the connected cylinder F will be made in sixty seconds, or one minute of time. Now during the complete rotation of the cylinder the battery-circuit through the coils of magnet I will be closed a number of times, depending upon the position of pointer D, as it will be remembered that this pointer will be struck and forced against wire H to close said circuit by the teeth of the cylinder, opposite which it may be caused to stand by the action of the galvanometer.

The number of times the circuit is closed in a minute is equal to the number of ampères indicating the strength of the current controlling the galvanometer-needle and pointer during that minute or sixty seconds; and if a given number of ampères flows for sixty seconds each second counts for a number of coulombs equal to the number of ampères indicated, and the whole minute for sixty times that number of coulombs. Therefore, if the time be noted when the meter is started into operation, at any time thereafter the quantity of current which has passed may be ascertained in coulombs by multiplying the indications given by the register in such time by the number of seconds in one minute—i. e., by sixty.

In practice I find that a machine based on one-minute periods of registration, such as I have described, is sufficiently accurate for all practical purposes, though it will be readily understood that the toothed circuit-closing cylinder might be arranged to complete its revolution in any given time.

I do not confine myself to any particular form of registering mechanism, nor to any particular means for transmitting motion to the register from the galvanometer-needle, or causing the register to be operated a given number of times to correspond with the position of the needle, as it is only essential that a registry be made, and means provided for comparing the registration with the time in which it is made.

The wire H behind the pointer is of course only necessary when the register is operated electrically. The needle may be caused to transmit motion through mechanical connections to the register, and the time mechanism may be actuated by a spring, or cord and weight, suitable regulating devices being used, in well-known manner. I do not, however, desire to claim here a mechanical transmission of the movements of the needle, as I intend filing separate application for patent therefor.

I have before stated that the galvanometer is arranged between the poles of a permanent horseshoe-magnet. This is for the purpose of increasing the intensity of the magnetic field about the galvanometer-needle, and thereby rendering said needle more sensitive to the influence of the current traversing the coils. The excursion of the needle being thus rendered greater for a given strength of current, the graduations of the scale E may be farther apart and more easily read, and the series of teeth of the cylinder may be also farther apart, and therefore more convenient to be arranged.

I have rendered the poles of the permanent magnet adjustable by means of screw pole-pieces passed laterally through the magnet-legs near their ends, such screw pole-pieces passing through the ends of and into the interior space of the frame in which the galvanometer-needle is pivoted.

The intensity of the magnetic field about the needle may be increased by causing the tips of these cross-pieces to approach the ends of the needle, or diminished by causing them to recede therefrom. Such regulation of the field may at times be necessary if it is observed that the needle is either too sluggish or too sensitive in its movement; or, if the needle should have a tendency to dip, it may be brought to proper position by adjusting either one or both pole-pieces, as may be found necessary by trial.

The use of the permanent magnet and adjustable pole-pieces is not only of importance as enabling the regulation of my improved meter, but will be found advantageous with any kind of galvanometer and under many different conditions of use.

Having now fully described my said invention and explained its operation, what I claim, and desire to secure by United States Letters Patent, is—

1. In an electric meter, the combination, with a galvanometer arranged to be actuated by the current to be measured, of a separate circuit, an electro-magnetic register included in said separate circuit, and a circuit-closing mechanism for said circuit controlled by the galvanometer-needle as it assumes positions under the influence of the current through the galvanometer, substantially as described.

2. In an electric meter, the combination, with a galvanometer arranged to be actuated by a current to be measured, of a local circuit, including the galvanometer-needle, graduated sets of contacts operating to close the local circuit as the needle assumes positions under the action of the current, and an electro-magnet arranged to operate a register and included in the local circuit, substantially as described.

3. In an electric meter, the combination, with a galvanometer arranged to be actuated by a current to be measured, of a separate circuit, an electro-magnetic register included in said separate circuit, mechanism arranged to operate, in connection with the galvanometer-needle, for closing said separate circuit as said needle assumes positions under the influence of the current through the galvanometer, and a time mechanism for actuating said circuit-closing mechanism, substantially as described.

4. The combination, with a galvanometer and a registering mechanism arranged to be controlled by the galvanometer-needle through electric connections, of a time mechanism controlling such electric connections, substantially as and for the purpose set forth.

5. The combination, with the galvanometer, of the permanent magnet having adjustable pole-pieces opposite the ends of the galvanometer-needle, substantially as and for the purpose set forth.

6. In an electric meter, the combination, with a galvanometer arranged to be included in a circuit the current on which is to be measured, of an electro-magnetic registering mechanism in a separate circuit, automatic circuit-closing devices in said separate circuit governed by the needle as it assumes positions under the influence of current, and means for regulating the sensitiveness of said needle, whereby it will be caused to take positions properly in accordance with the currents and circuit-closing devices, substantially as set forth.

7. In an electric meter, the combination, with a galvanometer in a circuit the current on which is to be measured, of an electro-magnetic registering mechanism in a separate circuit, closing and breaking devices in said separate circuit, and arranged to be regulated in their action by the galvanometer-needle, and a time mechanism arranged to actuate said circuit closing and breaking devices in conjunction with the needle.

8. In an electric meter, the combination, with a galvanometer arranged to be included in a circuit the current on which is to be measured, of an electro-magnetic registering mechanism in a separate circuit, automatic circuit-closing devices in said separate circuit governed by the needle as it assumes positions under the influence of current, and means for regulating the sensitiveness of said needle, whereby it will be caused to take positions properly in accordance with the currents and the circuit-closing devices, as set forth.

In testimony whereof I affix my signature in presence of two witnesses.

JULES CAUDERAY.

Witnesses:
JULES DUTRUIT,
RODOLPHE DUTRUIT.